(12) United States Patent
Cao et al.

(10) Patent No.: US 8,356,095 B2
(45) Date of Patent: Jan. 15, 2013

(54) METHOD AND APPARATUS FOR TRANSFERRING CONTEXT INFORMATION ON WEB SERVER

(75) Inventors: Bao Hua Cao, Beijing (CN); Jing Li, Beijing (CN); Jian Wang, Beijing (CN); Li Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/749,031

(22) Filed: Mar. 29, 2010

(65) Prior Publication Data

US 2010/0250740 A1    Sep. 30, 2010

(30) Foreign Application Priority Data

Mar. 31, 2009   (CN) .......................... 2009 1 0133409

(51) Int. Cl.
*G06F 15/173* (2006.01)
*G06F 15/16* (2006.01)
*G06G 15/16* (2006.01)

(52) U.S. Cl. .......................... 709/224; 709/202; 709/227

(58) Field of Classification Search .................. 709/224, 709/202, 227

See application file for complete search history.

(56) References Cited

U.S. PATENT DOCUMENTS

| | | | | |
|---|---|---|---|---|
| 2002/0051460 A1* | 5/2002 | Galbi et al. | .................. | 370/412 |
| 2003/0182512 A1* | 9/2003 | Hammarlund et al. | ....... | 711/133 |
| 2003/0206192 A1* | 11/2003 | Chen et al. | ..................... | 345/733 |
| 2004/0210500 A1* | 10/2004 | Sobel et al. | ..................... | 705/35 |
| 2006/0227754 A1* | 10/2006 | Ko | ................................ | 370/338 |
| 2006/0248199 A1* | 11/2006 | Stanev | .......................... | 709/227 |
| 2006/0248283 A1* | 11/2006 | Galchev et al. | ............... | 711/141 |
| 2006/0265575 A1* | 11/2006 | Damron | ........................ | 712/228 |
| 2006/0282509 A1* | 12/2006 | Kilian et al. | ................... | 709/217 |
| 2007/0033640 A1 | 2/2007 | Herness et al. | | |
| 2007/0061278 A1* | 3/2007 | Schirmer et al. | ................... | 707/1 |
| 2007/0156869 A1* | 7/2007 | Galchev et al. | ............... | 709/223 |
| 2007/0156907 A1* | 7/2007 | Galchev et al. | ............... | 709/227 |
| 2007/0211690 A1* | 9/2007 | van Megen et al. | ........... | 370/351 |
| 2008/0040418 A1 | 2/2008 | Power | | |
| 2008/0066079 A1 | 3/2008 | Nauerz et al. | | |
| 2008/0148259 A1* | 6/2008 | Hankins et al. | ............... | 718/100 |
| 2008/0288468 A1* | 11/2008 | Schirmer et al. | .................. | 707/3 |
| 2009/0199210 A1* | 8/2009 | Smith, Jr. | ...................... | 719/315 |
| 2009/0240647 A1* | 9/2009 | Green et al. | ..................... | 706/52 |
| 2009/0245122 A1* | 10/2009 | Maiocco et al. | ............... | 370/252 |
| 2010/0228650 A1* | 9/2010 | Shacham et al. | ................ | 705/34 |
| 2010/0274848 A1* | 10/2010 | Altmaier et al. | ............... | 709/203 |
| 2010/0306552 A1* | 12/2010 | LeVine et al. | ................. | 713/189 |
| 2011/0179133 A1* | 7/2011 | Fleischer et al. | .............. | 709/213 |

OTHER PUBLICATIONS

Verheeke, Bart, Unraveling Crosscutting Concerns in Web Services Middleware, Jan./Feb. 2006 IEEE Software.

(Continued)

*Primary Examiner* — Karen Tang
(74) *Attorney, Agent, or Firm* — Cantor Colburn LLP; Gail Zarick (57) ABSTRACT

A method for transferring context information on a web server that contains a context pool. The method includes: in response to the web server receiving a message, obtaining context information from the message, generating a unique identifier according to a thread for processing the message, associating the context information with the generated unique identifier, and storing the context information and the associated unique identifier in context pool of web server correlatively. In response to a web server obtaining the context information, generating an identifier according to a thread that is executed currently in the web server, and extracting context information for which an associated unique identifier is matched with the generated identifier from the context pool.

14 Claims, 7 Drawing Sheets

OTHER PUBLICATIONS

Mathes, et al., Enabling Post-Invocation Parameter Transmission in Service-Oriented Environments, Dept. of Mathematics and Computer Science, University of Marburg, Copyright 2006 IEEE, 6 pages.

Yan, Zhu, Interoperability & Cooperation Between ProActive and XServices, Copyright 2003-2004 Microsoft Corporation, 4 pages.

* cited by examiner

METHOD AND APPARATUS FOR TRANSFERRING CONTEXT INFORMATION ON WEB SERVER

CROSS REFERENCE TO RELATED APPLICATION

This application claims priority under 35 U.S.C. §119 from Chinese Patent Application No. 200910133409.X filed Mar. 31, 2009, the entire contents of which are incorporated herein by reference.

BACKGROUND OF THE INVENTION

1. Field of the Invention

The present invention relates to transferring context information contained in a web service invocation message. More particularly, the invention relates to a method and apparatus for transferring context information on a web server.

2. Description of the Related Art

Generally, an invocation or request between a plurality of web services is achieved by message transfer among a plurality of web services or applications. The term "web service" refers to web application based standard methods in which one web service invokes another web service by way of message transfer. Each web service is deployed in an application server such as a SOAP server, and each web service is performed through the application server.

The application server generally has the following functions: supporting the deployment and offloading of web services, monitoring network messages, receiving web service invocations or requests, parsing request messages, looking for web service programs to be invoked by request, transferring invocation parameters, performing web service programs, obtaining the process results of web services, packeting the results into standard web response messages, and sending messages to a requester.

Figure 1:
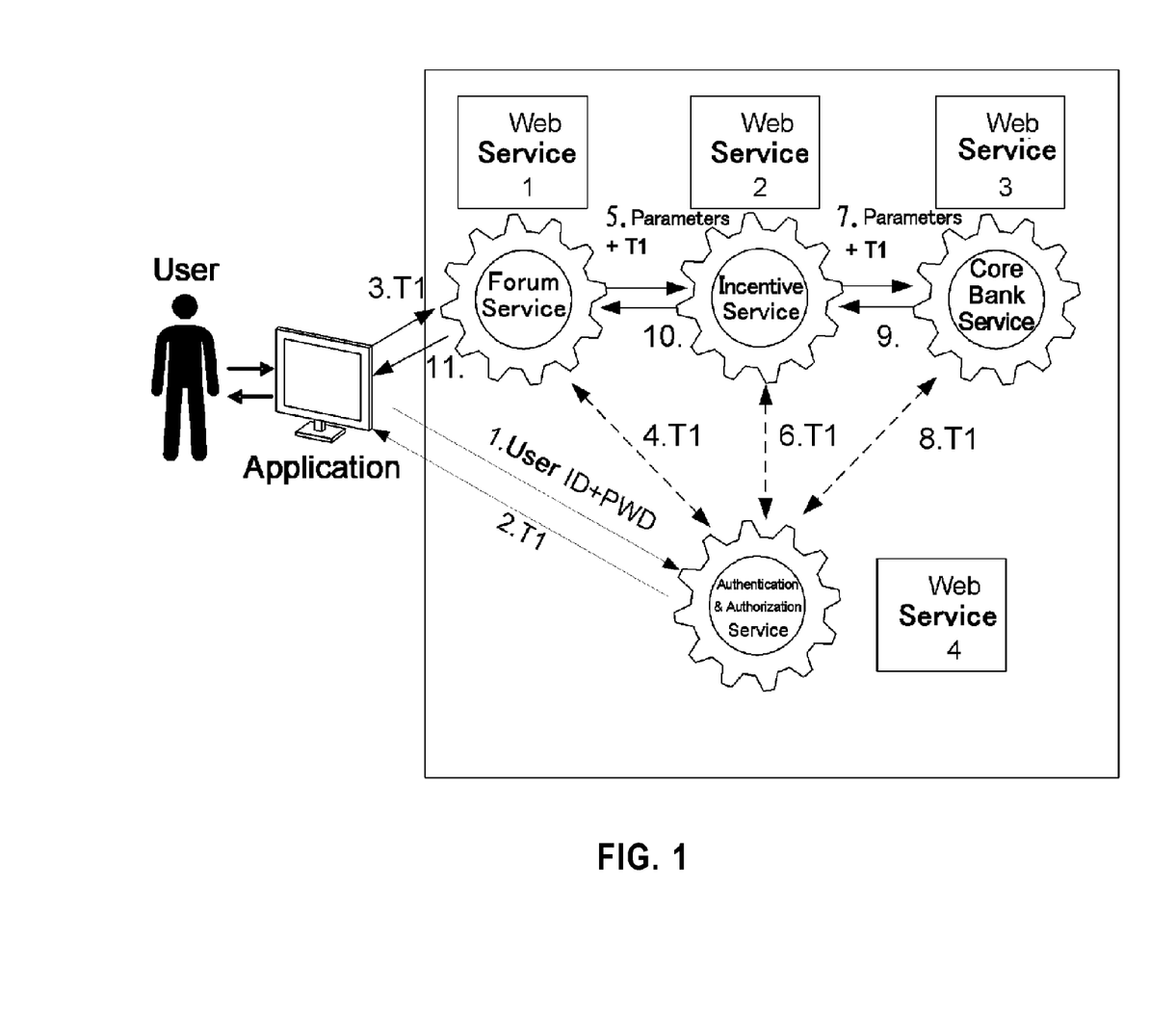
FIG. 1 is an example of an interaction between a user and a plurality of web services.

FIG. 1 is a typical example of an interaction between a user and a plurality of web services. In this typical example, as shown in FIG. 1, a user first enters a user ID and password (PWD) through a local computer application to transfer them to web service 4. The user ID and PWD are authenticated and are judged whether they are authorized by web service 4, which is responsible for the authentication and authorization service. Web service 4 returns a message (token T1 for example) to the local computer application after the procedure of authentication and authorization is complete. After the user is successfully authenticated, the user may require a forum service. At this time, the user transfers the token T1 received from web service 4 to web service 1. When web service 1 receives the token T1, web service 1 also transfers the token T1 to web service 4 to validate it and obtains the result from web service 4, as shown in dashed line 4. When the user requires an incentive service, for example accessing web service 2, the token T1 is required to be transferred from web service 1 to web service 2. At this time, when web service 2 receives the token T1, web service 2 also transfers the token T1 to web service 4 to validate it and obtains the result from web service 4, as shown in dashed line 6. When the user obtains a core bank service, for example accessing web service 3, the token T1 is required to be transferred from web service 2 to web service 3. At this time, similarly, when web service 3 receives the token T1, web service 3 also transfers the token T1 to web service 4 to validate it and obtains the result from web service 4, as shown in dashed line 8. As will be appreciated, there are possibly more web services. In the procedure of accessing the above, the user transfers the token T1 from web service 1 to web service 2, transfers the token T1 from web service 2 to web service 3, and transfers the token T1 from web service 3 to an additional web service (not shown). The message transferred between two web services may further include a variety of parameters other than the token T1.

In the art, in order to transfer the message containing token T1 and parameters between web services, with respect to web service 2 for example, when web service 2 receives a message, it parses so as to obtain token T1 and parameters, and then applies the token to authentication and applies parameters to the service process of web service 2. When web service 2 sends a message to web service 3, it is required to rebuild a message containing the token T1 and parameters in the server of web service 2. Meanwhile it is required to obtain the message related to the token T1 and parameters. The parameters can be obtained from the entity of web service 2, while the token T1 is still obtained from the message that is transferred in the same manner as parameters, that is, the token T1 is passed through the process of web service in the same manner as parameters. The process is as follows:

Service1.operate (T1, parameter1, parameter2)

In the case of transferring the token T1 as described above, there is a need to provide such an interface process to solve the problem of transferring the token T1 and parameters together. If there is other information, the interface program needs to be modified to include other information. Thus, the process interface needs to be modified to add and process new information to be transferred whenever there is a need to transfer a piece of new information that is not a parameter type. The programmer needs to modify the interface endlessly, which increases workload. Thus, a method is desired that can reduce such load and guarantee the effective transfer of respective information.

SUMMARY OF THE INVENTION

According to an aspect of the present invention, a method of transferring context information from a message to a web server containing a context pool is provided. The method includes: receiving a message by the web server; obtaining context information from said message; generating a unique identifier according to a thread for processing the message; associating the context information with the generated unique identifier; storing the context information and the associated unique identifier in the context pool of the web server correlatively; generating an identifier according to a thread that is executed currently in the web server if the web server is required to obtain the context information; and extracting the context information for which the associated unique identifier is matched with the generated identifier from the context pool.

According to another aspect of the present invention, an apparatus for transferring context information on a web server that contains a context pool is provided. The apparatus includes: a module for obtaining context information from a message received at a web server; a module for generating a unique identifier according to a thread for processing the message; a module for associating the context information with the generated unique identifier; a module for storing the context information and the associated unique identifier in context pool of web server correlatively; a module for generating an identifier according to a thread that is executed currently in web server; and a module for extracting context information for which an associated unique identifier is matched with the generated identifier from the context pool.

The present invention puts context information into a centralized storage region through centralized management, and accesses it through an identifier such as a thread ID. The context information can be shared relative to a service.

BRIEF DESCRIPTION OF THE DRAWINGS

The accompanying drawings illustrate embodiments of the present invention and together with the description, serve to explain the principles of the present invention. The embodiments illustrated herein are presently preferred; however, the present invention is not limited to the precise arrangements and instrumentalities shown, wherein.

DETAILED DESCRIPTION OF THE PREFERRED EMBODIMENTS

Figure 2:
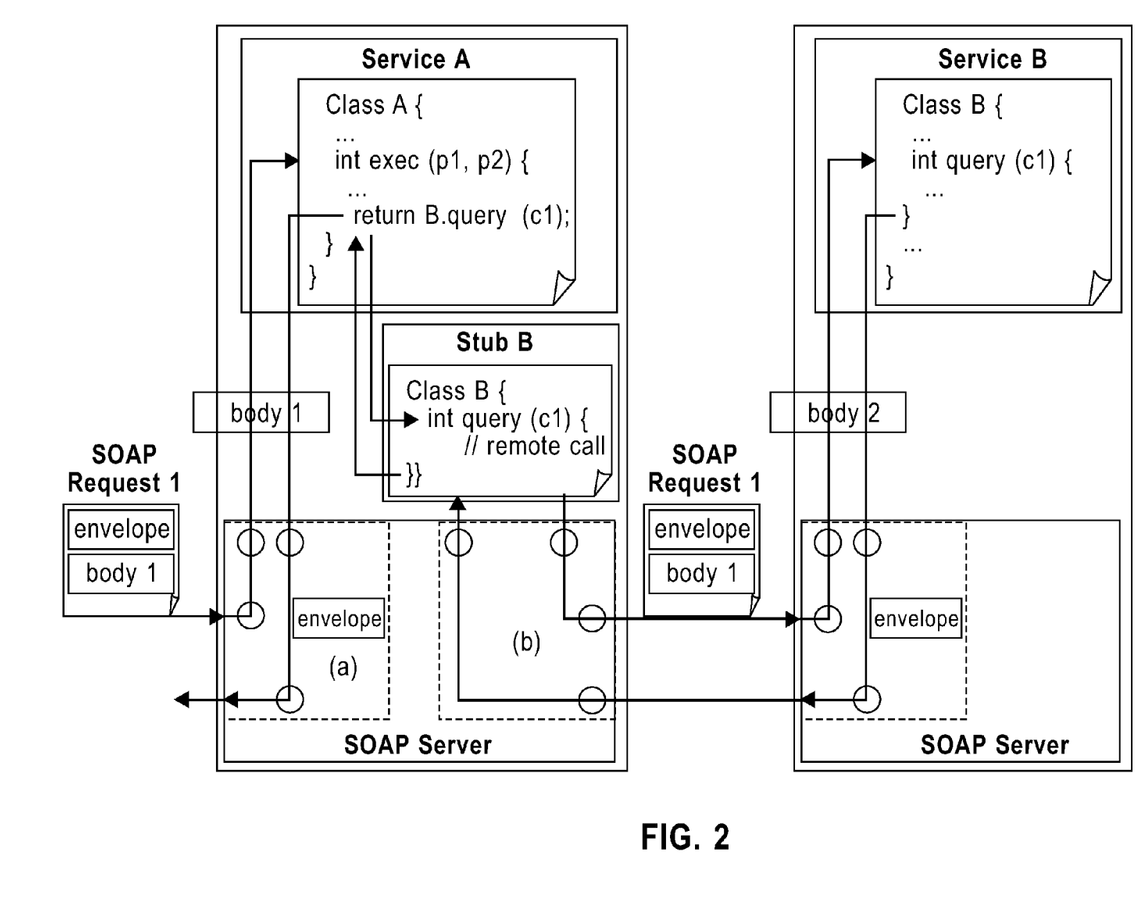
FIG. 2 is a diagram of invocation chains between web services.

The method of sharing context information according to the embodiment of the present invention as shown in FIG. 2 will be explained.

FIG. 2 is a diagram of invocation chains between web services. For example, in the field of web services, SOAP (Simple Object Access Protocol) protocol is generally used to transfer messages. SOAP is a light, simple, XML based protocol, and is designed to exchange structural and fixed information on the web. SOAP may be used in connection with many existing internet protocols and formats, including Hypertext Transfer Protocol (HTTP), Simple Mail Transfer Protocol (SMTP) and the like. It also supports a large amount of application programs ranging from message systems to remote procedure call (RPC). Other environments such as REST can also be included. The following embodiments of the present invention will be described in connection with SOAP protocol environment but the present invention is not limited thereto.

Service A in FIG. 2 may be similar with web service 1 in FIG. 1 (forum service), and service B may be similar with web service 2 in FIG. 2 (incentive service). Each of services A and B can be represented as a service having a particular function, and such service may be written and stored in advance by the programmer. Although service A in FIG. 2 is located in a SOAP server, the present invention is not limited thereto. Web server is a server that may accommodate, contain, and carry service A, such as a base station, handheld device, host and other server having corresponding functions.

Referring to FIG. 2, the SOAP server comprises a response component (a) and a request component (b) in which a plurality of extension points for a programmer exists, as indicated by little circles in components (a) and (b) in FIG. 2.

Herein, the term "extension point" refers to a kind of extension mechanism provided by a SOAP server. At each extension point, the programmer can write and preset a fragment of program code that has a particular function such as for parsing, searching, extracting, or storing. These preset extended program codes can be called back by the SOAP server according to predefined callback conditions during a web service invocation procedure. Herein, the program code deployed at extension points is named a "user code handler." In addition, the SOAP server further includes a context pool, which will be described later.

The specific procedure will be explained in connection with FIG. 2 herein below. In response to the SOAP server receiving a message such as a SOAP request, it is required to create a thread for processing such SOAP requests in a SOAP server. For example, a SOAP request first comes to the response component (a) at the SOAP server. Then, the SOAP request is parsed in the response component (a) by the user code handler. The procedure of parsing can employ any parsing method known by those skilled in the art. A SOAP request comprises envelope and body.

Typically, the envelope stores information such as performance, safety, availability, reliability, expansibility, authentication, time etc, which are often referred to as non-functional information. Such non-functional information can be regarded as context information in the present invention. Typically, the body stores core traffic logic associated with the function to be performed, which often is referred to as functional information, such as parameters. By the above parsing process, the context information and body information can be obtained and the envelope and body can be separated.

After the envelope and body are separated, the obtained body is provided to service A to perform a corresponding operation, which is omitted as the particular implementation is known by those skilled in the art. Thus, service A can avoid being written in a different interface, which is convenient in aspects such as expansibility, maintenance, alteration, and inspection. Moreover, when context information is obtained, a unique identifier can be obtained preferably through a user code handler that is written in advance by a programmer according to a thread that is executed currently. The unique identifier is used to identify context information uniquely.

The unique identifier can employ the current thread ID that executes the current task in a SOAP server. Then, preferably, the association relationship between context information and current thread ID is created through a user code handler that is written in advance by the programmer, and context information is stored in the context pool. The above respective steps can be achieved in any other manner than a user code handler, such as a special thread or a special application.

During the process of service A, if service A invokes a program such as stub B and if stub B needs to access service B, the request component (b) in the SOAP server extracts context information from the context pool. When required to extract the thread ID of the currently executed thread obtained through a user code handler that is written in advance by the programmer, context information for which an associated unique identifier is matched with the current thread ID is extracted from the context pool according to the current thread ID. Thus, the SOAP server builds a new SOAP request through the obtained context information and the functional information transferred from stub B and transfers it to service B. Likewise, service B can also perform a similar procedure to invoke the next service, thus forming the invocation chain among a plurality of services.

Procedures will be described where the context information is stored in response to the SOAP server receiving a SOAP request and the context information is extracted in response to a web server being required to obtain the context information. Thus the context information can be shared between components (a) and (b) which belong to two different domains. These procedures are all performed in the current SOAP server. When a SOAP request is sent from one SOAP server to another one, the other server can also perform a similar operation. Thus, the invocation chain relationship of a plurality of services is formed as described. Thus, the context information can be effectively transferred among a plurality of SOAP servers by using the method of the present invention, and a SOAP service in each SOAP server does not need to know information that isn't associated with its function at all.

Further, after the context information having association relationship is stored in component (a), the context information can be extracted in component (b) as needed. However, the present invention is not limited thereto. The context information can be extracted from component (a) as needed. Further, the context information can be extracted during the procedure of service A as needed, depending on the access permission of the context pool. As long as the context pool contained in the SOAP server can be accessed by components (a) and (b) and service A itself, the context information can be extracted from the context pool.

The above embodiment describes the procedure for obtaining the context information from the message, associating the context information with a unique identifier and storing it in the context pool, and thereafter extracting the context information from the context pool. As should be appreciated that after the context information is stored in the context pool and is extracted, it isn't necessarily eliminated.

Preferably, if the entire procedure performed by the current thread that processes the current received SOAP request ends and exits the SOAP server, then the current context information stored in the context pool can be eliminated, so as to save space. Of course, additionally or alternatively, the redundant context information in the context pool can be eliminated in a manner of periodical cleaning, which will be described later.

As described, the term "context pool" is a storage entity having some storage space and capable of being accessed by a SOAP server. Such storage entity can be implemented in many forms, such as physical storage, database, cache, and other form having corresponding storage functions.

As described, centralized management can be achieved through the context pool. The context information is placed in a centralized region, and preferably is accessed through a thread ID, thus the context information can be shared apparently relative to the service. That is, by using the method of the present invention, while the context information is effectively transferred, the service in the server doesn't need to know how to process and transfer context at all but only needs to perform the dedicated function operation itself.

Further, although the example described uses thread ID as a unique identifier and identifier in the above embodiment, any other form can be used as a unique identifier and an identifier which will be described later. Although in such an example the context information is obtained in component (b), it can be obtained at any other time if needed, which will be described later. SOAP protocol is used in the above embodiment, but any other protocol such as REST can be used. Also, the present invention can be applied to any other environment other than a web service environment.

The method for transferring information in a web service invocation chain, and the method for storing and extracting the context information will be described in connection with FIGS. 3, 4 and 5 respectively.

Figure 3:
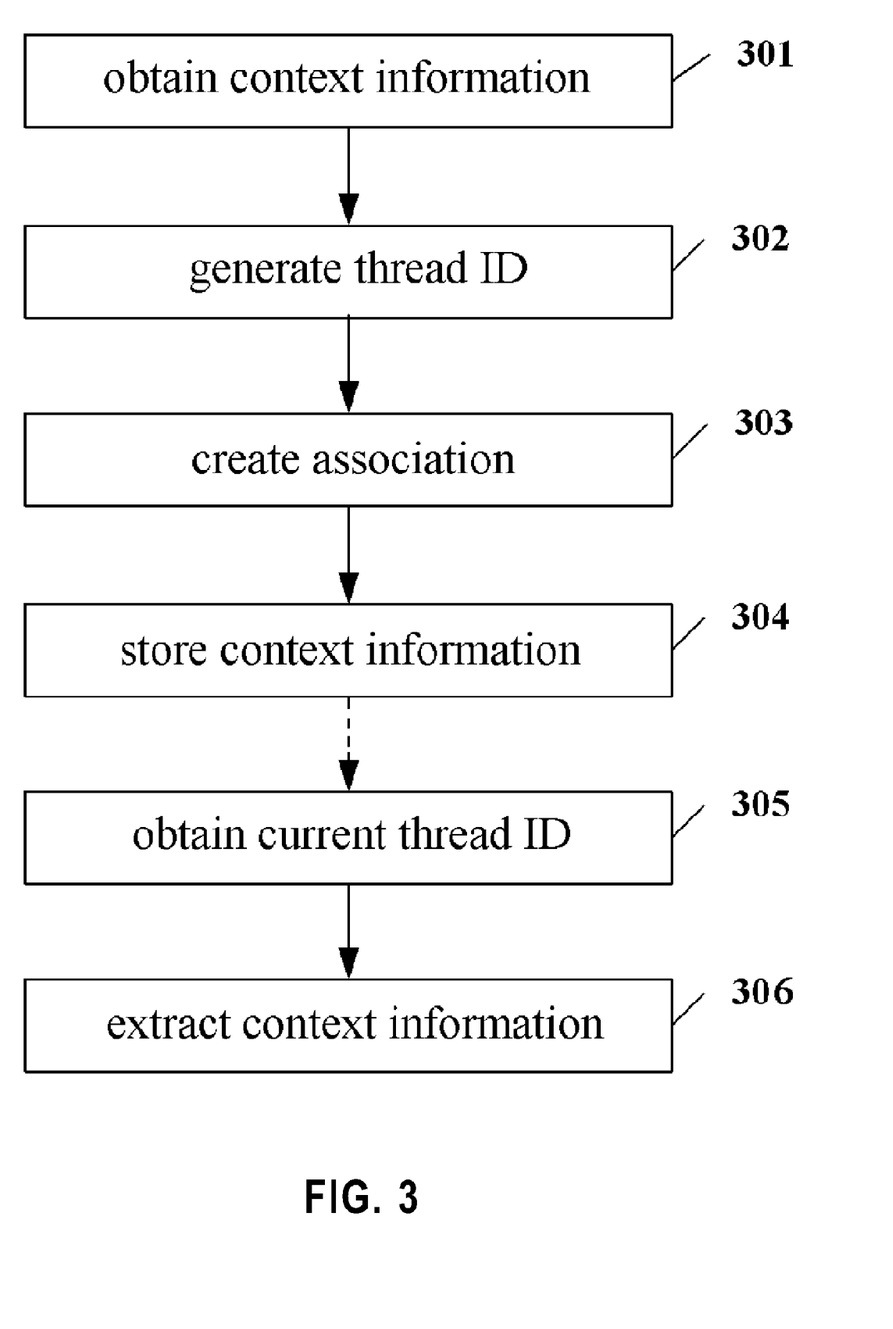
FIG. 3 is a flowchart of a method for transferring context information according to embodiments of the present invention.

FIG. 3 is a flowchart of a method for transferring context information according to embodiments of the present invention. Web services invoked between each other are located in the same or different servers, such as a SOAP server, wherein each SOAP server has the accessible context pool.

In step 301, in response to a SOAP server receiving a SOAP request, context information is obtained from the SOAP request. The context information is obtained by parsing a SOAP request through a user code handler that is written in advance by the programmer. Before context information is obtained, a thread for executing the message is already created in a SOAP server. In step 302, a unique identifier is generated according to the currently created thread by the SOAP server, and following the embodiment, a unique identifier employs the thread ID of the current thread. It is noted that, the unique identifier herein is an identifier used to identify context information uniquely, and other identifiers can be used. In step 303, the association relationship between the context information and the thread ID of the current thread is created. Next, in step 304, the context information is stored in the context pool in the SOAP server. The thread ID of an associated current thread is also stored in the context pool, and accordingly the context information can be found.

Modification to each service interface can be avoided by separating context information and system information and storing context information.

If a SOAP server requires context information, i.e., in response to the SOAP server being required to obtain the context information, in step 305, the thread ID of the current thread is obtained from the currently executed thread of the SOAP server through the user code handler that is written in advance. In step 306, the context information that is matched with the obtained thread ID is extracted from the context pool according to the obtained thread ID. In the case where the thread ID uniquely identifies the context information, the context information corresponding to the thread ID of the current thread can be found by using the thread ID of the current thread as an identifier. If other identifying means are employed, other identifying means that can find the context information for the purpose of finding the context information from the context pool must be obtained.

For example, the steps 305 and 306 can be performed when service A sends a new request to service B; or the steps 305 and 306 can be performed when needed during the processing of service A. Thus, the steps 305 and 306 can be performed whenever it is needed in the SOAP server, after the context information is stored in the context pool. In fact, there are many other steps or processes before steps 305 and 306, and steps 305 and 306 can be performed in different environments. These are not all encompassed in the present invention, thus the dashed line is used to represent these other steps in FIG. 3.

The detailed implementation of the steps of obtaining the context information and extracting the context information for FIG. 3 are described in connection with FIGS. 4 and 5 respectively below.

Figure 4:
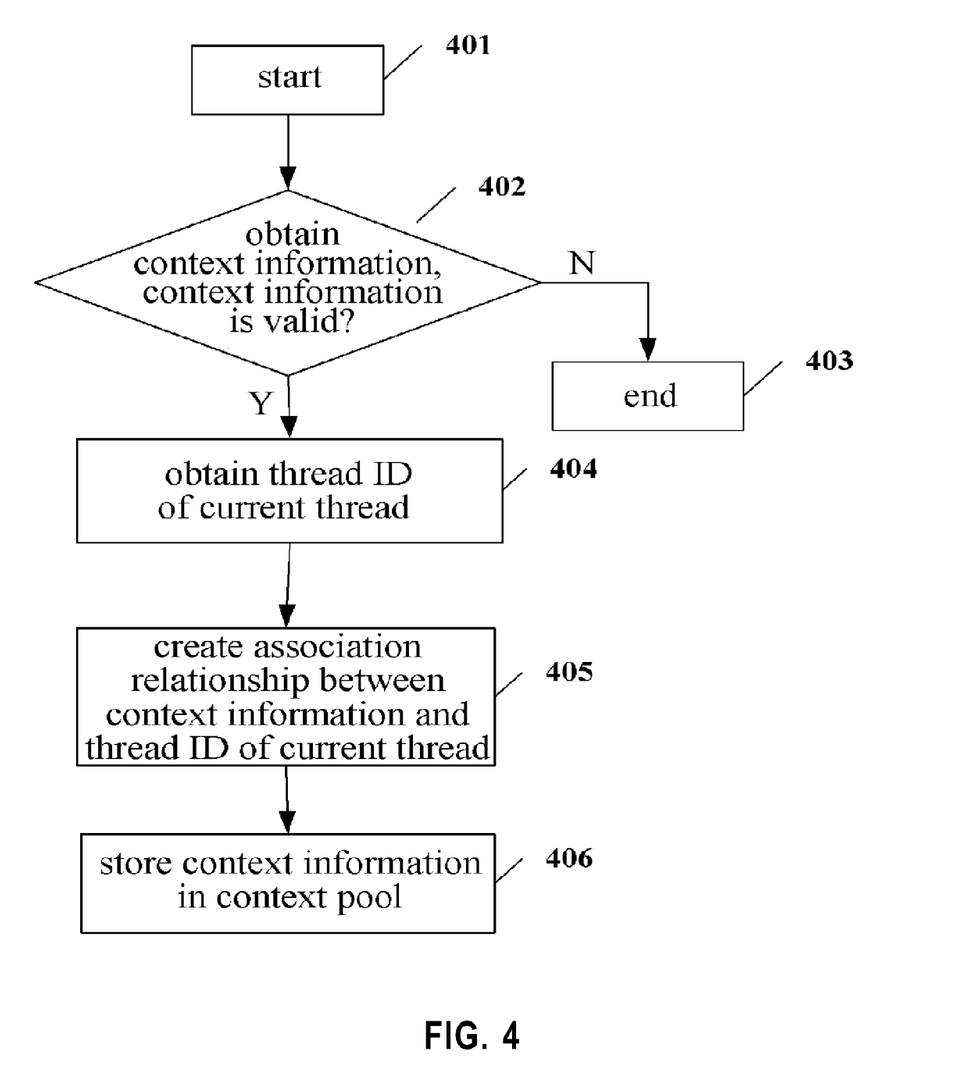
FIG. 4 is a flowchart of a method for obtaining the context information according to an embodiment of the present invention.

FIG. 4 is a flowchart of a method for obtaining the context information according to an embodiment of the present invention. The method starts in step 401. In step 402, the context information is obtained from the parsed SOAP request and is validated. Herein the validation refers to judging whether the context information is correct context information or not, for example, eliminating other unconcerned information or infinite information that can not be stored.

If the context information is invalid in step 402, the method turns to step 403, in which the process ends. If the context information is valid in step 402, the method turns to step 404, in which the thread ID of the generated thread is obtained.

Then, the method turns to step 405, in which the association relationship between the context information and the thread ID of the current thread is created. For example, the context information is associated with the thread ID, or the context information is bound with or attached with the thread ID. After the context information is associated with the thread ID, the method turns to step 406, in which the context information is stored in the context pool.

Herein, it is advantageous to improve the use efficiency of the context information by judging the validation of the context information, but the present invention is not limited thereto.

Figure 5:
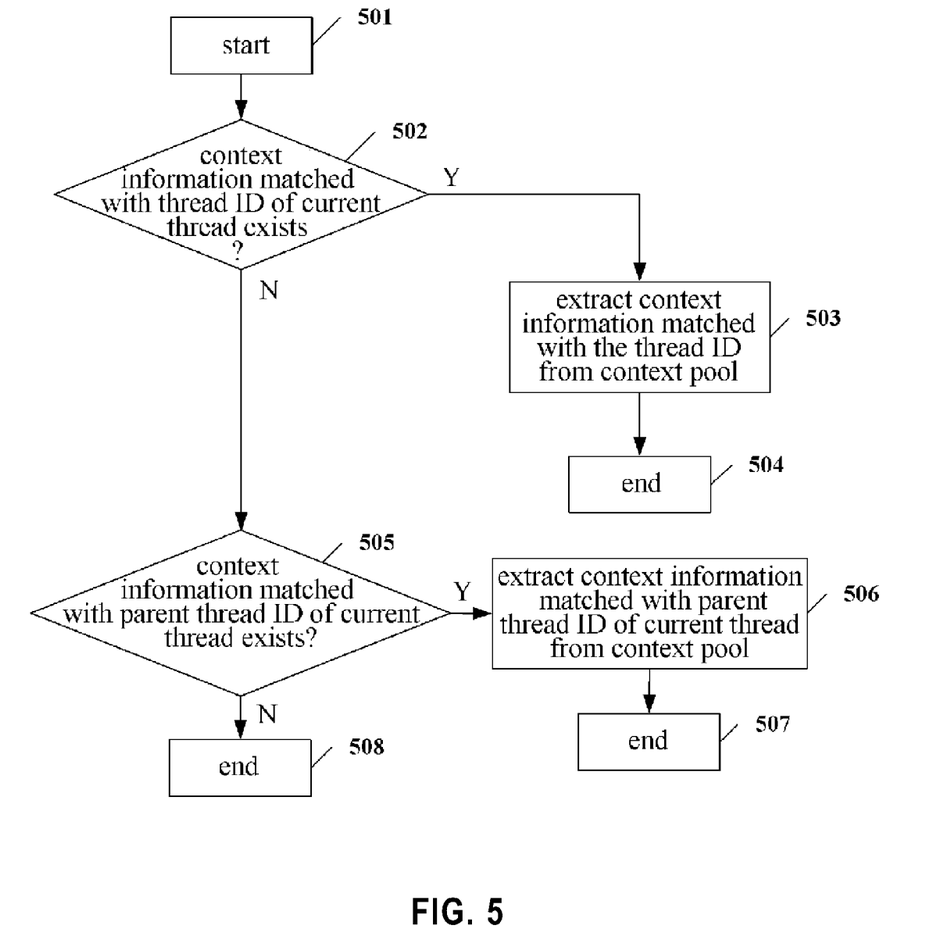
FIG. 5 is a flowchart of a method for extracting the context information according to an embodiment of the present invention.

FIG. 5 is a flowchart of a method for extracting the context information according to an embodiment of the present invention. The detailed step of extracting is described in connection with FIG. 5 below.

In step 501, the procedure of extracting starts. In step 502, it is judged whether the context information matched with the thread ID exists; that is, whether context information for which an associated unique identifier is matched with the thread ID exists. If the context information matched with the thread ID exists in step 502, the method turns to step 503, in which the context information matched with the thread ID is extracted from the context pool. Then, the method turns to step 504, in which the procedure of extracting ends.

However, it is possible that the context information matched with the thread ID does not exist in the judgment of step 502. At this time, the thread may end (illegally end for example) or the thread itself may end but the child thread may still exist (parent-child threads relationship exists for example). It can not be determined that the context information associated with the thread ID does not exist at all, even if the thread ends.

Accordingly, there is a need to know whether a parent-child thread relationship exists during the execution of the thread. Herein, the terms "parent thread" and "child thread" are threads having a parent-child relationship. The parent thread can derive its child thread, the child thread can further derive its secondary child thread and so forth.

If the execution of the thread ends, then either the thread ends completely, the thread itself ends but its child thread doesn't end, or the next child thread of its child thread doesn't end, and so forth. The thread itself may have its own child thread. If a thread generates a new child thread, the context information of the thread can also be used by its child thread. The detailed principle of such a thread tree is known by those skilled in the art, and will not be described herein for the sake of brevity.

In the case of a thread tree, the context pool according to embodiments of the present invention can be used to store such a thread tree having the parent-child relationship among respective threads. If a thread has its own child thread, it can be determined whether the context information matched with the parent thread ID of the current thread exists or not according to the thread tree.

Thus, during the procedure of extracting, if the context information which is matched with the thread ID doesn't exist, it is judged in step 505 of FIG. 5 whether the context information matched with each parent thread ID of the thread exists in the context pool; that is, whether context information for which an associated unique identifier is matched with the parent thread ID does exists. The purpose of judging whether the context information matched with each parent thread ID of the thread exists is that there is a need to query the thread tree if the thread tree exists. The threads having a parent-child relationship in the thread tree are all possibly threads associated with the current thread, and the context information of the threads having parent-child relationship is also applied to the current thread.

If it is determined that the context information matched with each parent thread ID of the thread exists in step 505, then the method turns to step 506, in which context information for which an associated unique identifier is matched with parent thread ID of the thread is extracted from the context pool. The process ends in step 507. Although the thread itself ends, the context information can also be shared through reference to the context information coinciding with its child thread since the child thread exists. The child thread herein may be any child thread in any level in the thread tree. Otherwise, in step 508, if the corresponding context information doesn't exist in the thread pool, the procedure of extracting ends.

The present invention takes account of the presence of such a parent-child relationship, and thus can provide a solution to solve a problem of extracting in the case that the current thread doesn't exist but its child thread (or next deeper level child thread) exists during the procedure of extracting.

The thread pool technology can also be employed during execution of the thread.

If the thread pool technology is employed, then it means that the thread that is currently executed at the SOAP server is possibly the allocated thread from the thread pool. Suppose that the context information in the context pool still exists, i.e. it hasn't been cleaned; it is possible that the thread ID cannot uniquely identify a piece of context information. Thus, a thread borrow ID is introduced in the embodiment of the present invention, which is an identification of the thread in the thread pool. Thus, if the thread borrow ID is incorporated and/or combined with the thread ID (thread borrow ID+thread ID for example), the context information can be uniquely identified. Thus, in the present invention, other than the thread ID being used as an identifier/unique identifier, the combination of thread borrow ID and thread ID and any other suitable manner can also be used as an identifier/unique identifier.

The embodiment of employing the thread ID of the current thread described above in the description doesn't account for employing the thread pool. In the embodiment based on the thread pool, the borrow thread ID is introduced in the parsing process. The context information is associated with the combination of thread ID and thread borrow ID in the thread pool such that unique context information can be obtained according to the combination of thread ID and thread borrow ID during extracting. Other procedures are similar with the above procedure.

Thus, the embodiment of the present invention takes account of the presence of a thread pool and a parent-child relationship thread, such that the present invention is more suitable to a particular environment. The present invention isn't limited thereto, and other process environments can also be introduced and pertinent processes can also be employed. The two cases presented herein are illustrative.

During the procedure that the context information is managed by using a context manager, there is a possibility that all the threads and their respective child threads end but the context information associated with such threads exist in the thread pool. An example of this is obtained when a thread ends due to an exception. Such context information is useless, thereby forming redundant information. Thus, in order to save the space of a context pool and improve efficiency of sharing, there is a need to remove useless context information from the context pool periodically. It is understood that periodical cleaning can be performed by a periodical check program, or a periodical check thread. A clean module can also be configured in the context manager for checking the context pool periodically. The context information associated with the thread ID can be removed from the context pool if the thread ID doesn't exist in storage. Of course, such maintenance is alternative, and other manners can also be used to implement the periodical cleaning as will be appreciated by those skilled in the art.

Figure 6:
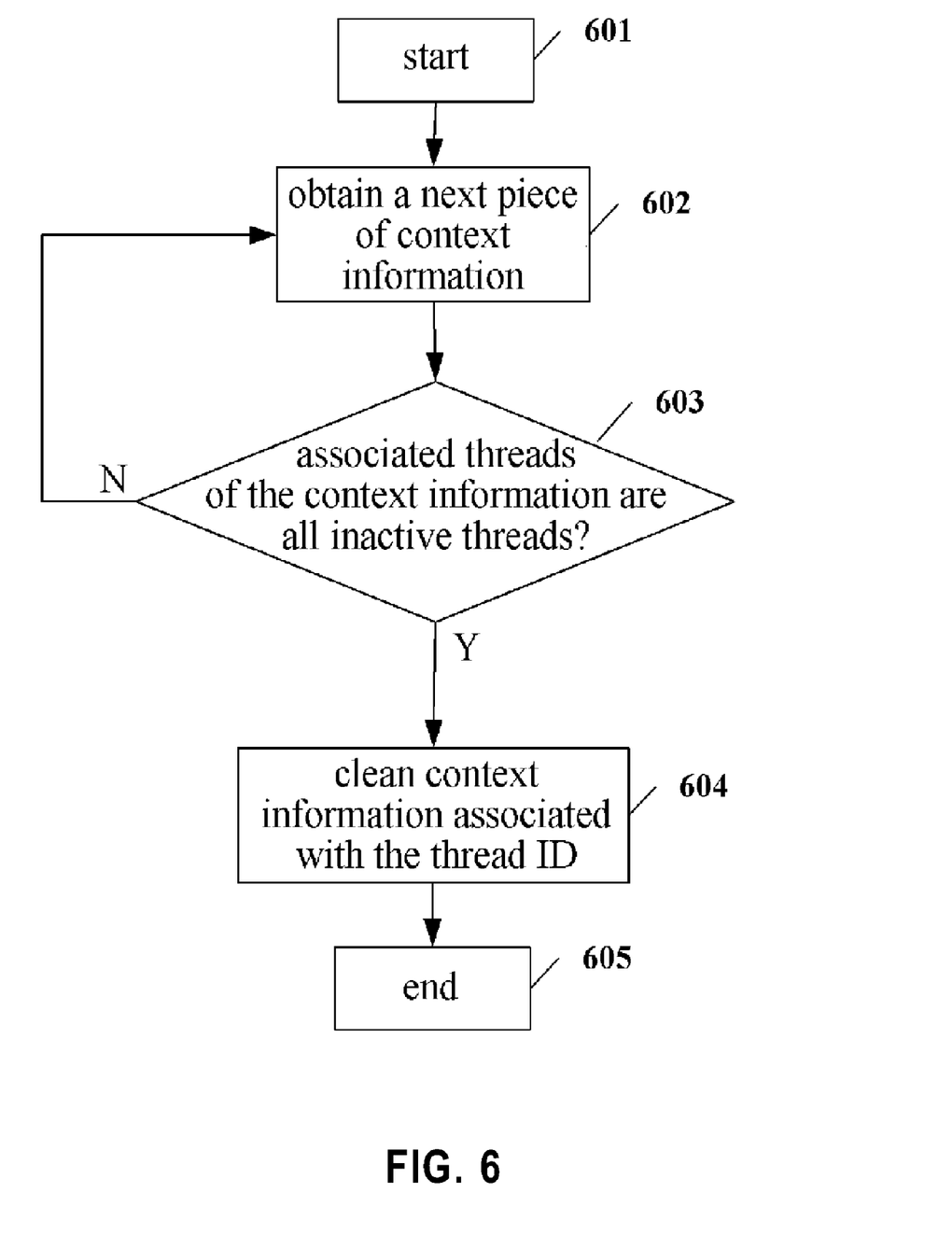
FIG. 6 is a flowchart of a method for maintaining the context information according to an embodiment of the present invention.

FIG. 6 is a flowchart of a method for maintaining the context information according to the embodiment of the present invention. First, the method starts in step 601; and in step 602, a piece of context information is obtained periodically by possibly using a timer.

In step 603, it is judged whether or not threads that are associated with the context information are inactive. The associated threads may include all of the information of all threads that are associated with the context information, for example, the thread represented by the thread ID that is only associated with the context information, or the thread represented by the parent thread ID that is associated with the context information (if the parent thread exists). As described, although it is possible that the current thread doesn't exist, the thread ID having a parent-child relationship may be still useful due to the presence of a thread tree.

If it is determined that threads that are associated with the context information are all inactive threads in step 603, the method turns to step 604, in which the context information associated with the thread ID is cleaned. Then, the process ends in step 605, such that useless context information is deleted from the context pool.

If it is determined that threads that are associated with the context information are not all inactive threads in step 603, which means that the context information associated with the thread ID is useful, the method returns to step 602 to obtain and check the next context information sequentially. This procedure is repeated for the purpose of periodical checking.

Figure 7:
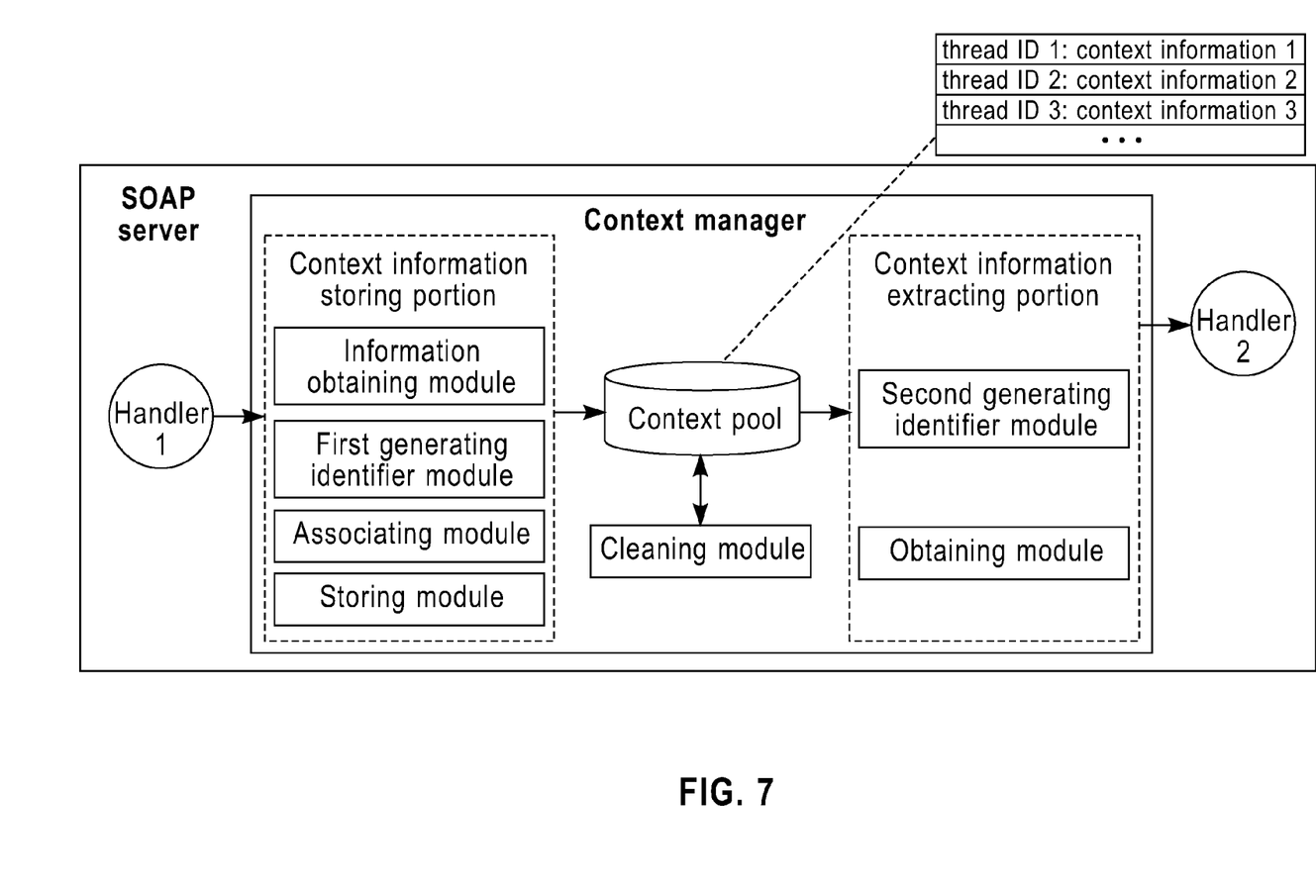
FIG. 7 is a clock diagram of an apparatus for transferring information according to an embodiment of the present invention.

FIG. 7 is a clock diagram of an apparatus for transferring information according to the embodiment of the present invention. A context manager is provided to manage and share the context information. The context manager may be accessed, for example, by a plurality of 2 user code handlers. The context manager includes a context information storing portion, a context pool and a context information extracting portion.

According to the division of functions, the context information storing portion may include: an information obtaining module for separating the currently received message into the envelope and body of the message, for example, SOAP request, and extracting the context information which belongs to non-functional information from the envelope; a first generating identifier module for generating a unique identifier according to the currently created thread to uniquely identify context information wherein the generating manner isn't limited; an associating module for forming one-on-one relationship between context information and the unique identifier; and a storing module for storing context information in a context pool, wherein the above mentioned unique identifier may be used to find context information from context pool uniquely. The context information extracting portion may include: a second generating identifier module for generating an identifier according to the currently executed thread to identify the currently required context information from the context pool. It is noted that the obtained object, i.e., the currently executed thread, herein may be or may not be the same as the obtained object, i.e., the previously created thread, by the first generating identifier.

The context information extracting portion can further include an obtaining module for obtaining the context information from the context pool according to the identifier which is obtained by the second generating identifier module. Herein, the context pool is a storage entity having some storage space and capable of being accessed by respective components or modules (the context information storing portion and the context information extracting portion for example) in a SOAP server. As will be appreciated, such storage entity can be implemented in many forms, such as physical storage, database, cache, and other forms having a corresponding storage function.

As will be appreciated, a plurality of user code handlers for storing and extracting are entirely independent of each other, and can be performed respectively by the operator if needed. The operator can decide which procedure is performed in which user code handler.

According to an alternative embodiment, the context manager of the present invention may further include a cleaning module for maintaining the context information stored in the context pool periodically. For example, a timer may be included in the cleaning module. The context information is obtained periodically by the timer, and it is checked whether the thread associated with the context information exists or not in storage, wherein the associated thread may include all of the information of all threads that are associated with the context information such as the thread represented by the thread ID that is only associated with the context information, or the thread represented by the parent thread ID that is associated with the context information.

The purpose of such judgment is to know whether or not the currently stored context information is still useful. If the associated thread exists, it means that the current context information is useful; if the associated thread doesn't exist, it means that the current context information is useless, wherein the useless context information can be removed, thereby the periodical maintenance can be achieved. Of course, the present invention doesn't limit maintenance to such a manner, and another manner may be used to implement.

The apparatus for transferring context information in a web service invocation chain according to embodiments of the present invention employs a type of centralized management, places context information required to be shared into a centralized storage region, and accesses the information through technologies such as thread ID, incorporation of thread ID and thread borrow ID, thread tree, thereby sharing context information between different user code handlers of web service. Although the present invention has described sharing of context information in a web service invocation chain, such mechanism of sharing information can also be applied to various application, such as a distributed application.

The context information can be uniquely identified, stored and extracted by using respective preferred embodiments of the present invention, and the outdated context information in the context pool can also be cleaned periodically. Further, the thread tree can also be better supported.

In the embodiment of the present invention as shown in FIG. 2, although services A and B are located in different SOAP servers respectively, services A and B may also be located in the same SOAP servers. The components (a) and (b) in FIG. 2 may belong to different physical components, software components, modules, firmware and the combination thereof, and may also be implemented together.

The present invention can take the form of an entire hardware embodiment, an entire software embodiment or an embodiment containing both hardware and software elements. In a preferred embodiment, the present invention is implemented in software, which includes but is not limited to firmware, resident software, and microcode. Furthermore, the present invention can take the form of a computer program product accessible from a computer-usable or computer-readable medium providing program code for use by or in connection with a computer or any instruction execution system.

For the purpose of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The embodiments of the present invention are not limited to the aforementioned embodiments and can be expanded and modified, and the expanded and modified embodiments are also included in the technical scope of the present invention. Additional advantages and modifications will readily occur to those skilled in the art. Therefore, the present invention in its broader aspects is not limited the specific details and representative embodiments shown and described herein. Accordingly, various modifications may be made without departing from the spirit or scope of the general inventive concept as defined by the appended claims and their equivalents. It is to be understood that both the foregoing general description and the following detailed description are exemplary and explanatory only and are not restrictive of the present invention, as claimed.

We claim:

1. A method of transferring context information from a message to a web server containing a context pool, the method comprising:
    receiving a message by the web server, wherein the web server is a SOAP server and the message is a SOAP request, and the web server further comprises a response component for receiving a SOAP request and a request component for sending a SOAP request;
    obtaining context information from said message;
    generating a unique identifier according to a thread for processing the message;
    associating the context information with the generated unique identifier, wherein it is judged whether the context information is valid after obtaining context information and in response to the context information being valid, storing the context information and the associated unique identifier;
    storing the context information and the associated unique identifier in the context pool of the web server correlatively, wherein the storing the context information and the associated unique identifier is performed in the response component;
    generating an identifier according to a thread that is executed currently in the web server if the web server is required to obtain the context information;
    extracting the context information for which the associated unique identifier is matched with the generated identifier from the context pool, wherein the extracting the context information for which the associated unique identifier is matched with the generated identifier is performed in the request component;
    checking the context pool periodically for inactive threads by determining whether each thread associated with each piece of stored context information in the context pool exists; and
    removing from the context pool each piece of the stored context information where no associated threads exist.

2. The method according to claim 1, wherein the web server further comprises: the request component building a SOAP request that contains context information.

3. The method according to claim 1, wherein the context information is information in an envelope of the SOAP request.

4. The method according to claim 1, wherein the unique identifier is a thread ID of the current thread, and the step of extracting comprises:
    in response to there being no context information that is matched with the thread ID of current thread in the context pool, extracting context information for which the associated unique identifier is matched with the parent thread ID of the current thread through the thread tree from the context pool.

5. The method according to claim 4, further comprising:
    storing a thread tree in the context pool, the thread tree used to record parent-child relationship among respective threads.

6. The method according to claim 1, wherein the web server supports a thread pool, and the unique identifier and identifier are a combination of the thread ID with a borrow ID of the current thread.

7. The method according to claim 1, wherein the determining whether each thread associated with each piece of stored context information in the context pool exists further comprises:
    checking a thread ID associated with each piece of stored context information in the context pool; and
    determining whether an associated thread is represented by the thread ID and whether the thread ID is a parent thread ID of the associated thread.

8. An apparatus for transferring context information on a web server that contains a context pool, said apparatus comprising:
    a module for obtaining context information from a message received at a web server, wherein the web server is SOAP server and the message is SOAP request, and the web server further comprises: a response component for receiving SOAP request and a request component for sending SOAP request;
    a module for generating a unique identifier according to a thread for processing the message;
    a module for associating the context information with the generated unique identifier;
    a module for judging whether the context information is valid;
    a module for storing the context information and the associated unique identifier in context pool of web server correlatively, wherein the module for storing the context information and the associated unique identifier in the context pool is located in the response component;
    a module for generating an identifier according to a thread that is executed currently in web server;

a module for extracting context information for which the associated unique identifier is matched with the generated identifier from the context pool, wherein the module for extracting context information for which the associated unique identifier is matched with the generated identifier is located in the request component; and a module for checking the context pool periodically and for removing, from the context pool, stored context information for inactive threads based on a determination that each thread associated with a piece of stored context information in the context pool does not exist.

9. The apparatus according to claim 8, wherein a condition of the web server obtaining the context information comprises: the request component building a SOAP request containing context information.

10. The apparatus according to claim 8, wherein the context information is information in an envelope of the SOAP request.

11. The apparatus according to claim 8, wherein the unique identifier and identifier are the thread ID of the current thread.

12. The apparatus according to claim 11, wherein a thread tree used to record a parent-child relationship among respective threads is stored in the context pool; and the module for extracting context information for which an associated unique identifier is matched with the generated unique identifier from the context pool is adapted to extract context information.

13. The apparatus according to claim 8, wherein the web server supports a thread pool, and the unique identifier and identifier are a combination of the thread ID and borrowed ID of the current thread.

14. The apparatus according to claim 8, wherein the determination that each thread associated with a piece of stored context information in the context pool does not exist further comprises:

a check of a thread ID associated with each piece of stored context information in the context pool; and a determination as to whether an associated thread is represented by the thread ID and whether the thread ID is a parent thread ID of the associated thread.

\* \* \* \* \*